Oct. 22, 1935.  J. V. CAPUTO  2,018,646
CONTROL SYSTEM FOR ELECTRIC WELDERS
Filed July 8, 1931
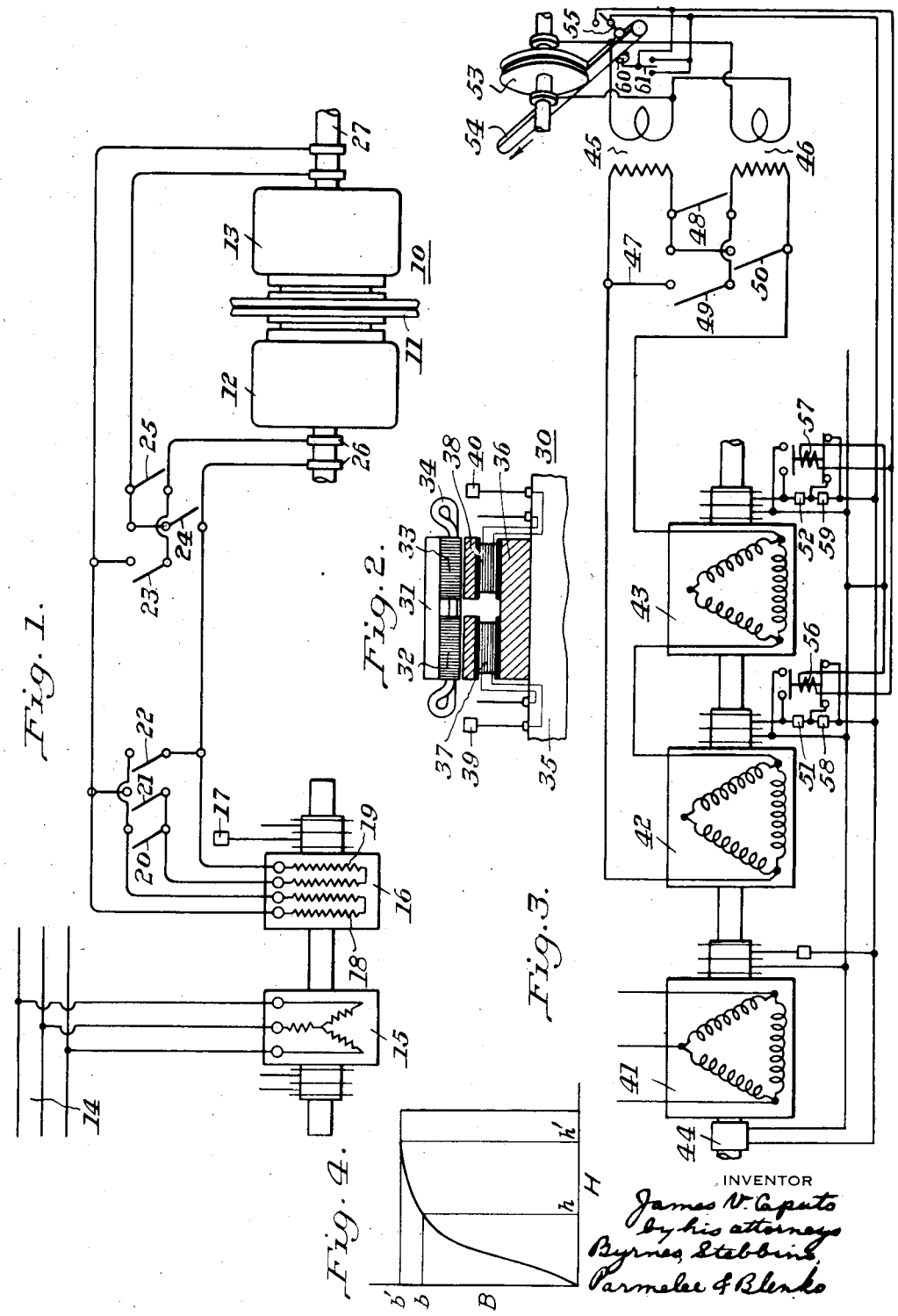
INVENTOR
James V. Caputo
by his attorneys
Byrnes, Stebbins,
Parmelee & Blenko Patented Oct. 22, 1935

2,018,646

UNITED STATES PATENT OFFICE 2,018,646

CONTROL SYSTEM FOR ELECTRIC
WELDERS

James V. Caputo, Girard, Ohio

Application July 8, 1931, Serial No. 549,442

14 Claims. (Cl. 219—4)

My invention relates to systems for supplying electrical energy to apparatus for welding pipe or other products by the resistance method of electric welding.

The welding of a single seam in formed pipe by the methods now in vogue requires a source of single phase alternating current. Many power companies object to supplying heavy intermittent single phase loads from their standard three phase distribution circuits without interposing rotating equipment to distribute the load on the three phases of the distribution system. Heretofore, this rotating equipment has been in the nature of a polyphase motor driving a single phase generator. Certain difficulties have been encountered, however, in such systems, in controlling the voltage induced in the secondary windings of the step-down welding transformers.

I have invented a system for phase conversion and voltage regulation by which electrical energy can be drawn from a polyphase system without unbalancing the latter and supplied to a welding apparatus in the form of single phase low voltage current without interfering with voltage control in any way and, in addition, providing an extraordinarily wide range of voltage control.

The invention also provides a system which is operable under stable conditions so that adjustments once made do not have to be continually altered. In accordance with one form of the invention, I provide a single phase alternating current generator with a plurality of windings positioned in the same slots of the generator armature core. By connecting these windings to the primaries of the welding transformers through switches for changing connections, I can connect the generator windings or the transformer windings, or both, in series or in parallel, to obtain a wide range of voltage variation.

In another form of the invention, I provide a single phase generator with a plurality of independent armature cores having a single armature winding common thereto and having separate magnetic fields cooperating with said cores to induce different voltages in different portions of said winding. By adjusting the magnitude and direction of the voltages induced in different portions of the winding, the net voltage supplied to the welding transformer may be varied.

In another form of the invention, I propose to drive a pair of generators by means of a single polyphase motor and to connect the generators so that their joint output is available for sending welding current through the welder. The generators are independently adjustable and their joint output, therefore, may be varied over an extensive range.

Another feature of the invention concerns means for interrupting the welding current after a length of pipe has been welded. For this purpose, I employ means controlled by the passage of pipe through a welder for energizing or de-energizing the field windings of the generators. In this way, it is unnecessary to open repeatedly circuits carrying large currents with the resultant destructive effect upon circuit-breaker contacts. Preferably, I shunt the generator fields and connect equivalent resistance in the exciting circuit. I thus avoid opening any circuits whatever and accomplish the control of the welding current with great ease and facility. I have also invented means for controlling the supply of welding current to the electrode in accordance with the speed of a pipe traversing the welder. By this means, it is possible to prevent fusing of the electrode or the pipe in case the latter does not move continuously through the welder. I also discontinue the supply of current in case the pipe moves through the welder at too high a speed. Under such circumstances, of course, a satisfactory weld is not obtained.

It will be apparent that the forms of the invention briefly described hereinabove are applicable to electric welding apparatus employing stationary or rotating transformers. While I have shown herein, in connection with one form of the invention, rotating transformers and, in connection with another, stationary transformers, any of the modifications shown may be employed with either type of transformer.

For a complete understanding of the invention, reference is made to the accompanying drawing illustrating the modifications above mentioned. In the drawing—

Figure 1 is a schematic diagram of the system employing the generator having two single phase windings in phase;

Figure 2 is a partial sectional view of a generator having a plurality of independent armature cores and field magnets;

Figure 3 is a schematic diagram of the system employing a plurality of generators driven by a single motor and showing the means for controlling the supply of current to the welder, in accordance with the passage of the pipe therethrough;

Figure 4 is a magnetization curve showing the zone of stable operation.

Referring in detail to the drawing and, for the present, to Figure 1 in particular, an electric welding apparatus 10, comprising an electrode 11 and transformer banks 12 and 13, is adapted to be supplied with single phase energy from a three phase supply circuit 14. It will be understood that the transformer banks 12 and 13 comprise a plurality of independent transformers symmetrically arranged and having their secondaries connected directly to the insulated portions of the electrode 11.

A polyphase motor 15, preferably a synchronous motor, is connected to the supply circuit 14 and is adapted to drive a generator 16. A single exciter may energize the field windings of the motor and generator. A generator field rheostat is indicated schematically at 17. The generator 16 is provided with a plurality of single phase windings 18 and 19. Corresponding portions of these windings are placed in the same slots in the generator armature core so that the voltages induced in the windings will be in phase.

The windings 18 and 19 of the generator 16 are connected to the transformers of the banks 12 and 13 by circuits including generator switches 20, 21, and 22 and transformer switches 23, 24, and 25. Variable voltage alternating current from the generator 16 may thus be supplied to the transformers through slip rings 26 carried by a shaft 27 on which the transformers are supported for rotation. By shifting the positions of the switches 20 through 25, the windings of the generator 16 or the primary windings of the transformers in banks 12 and 13, or both, may be connected either in series or in parallel, or in any desired combination. Thus a wide range of welding voltage is obtainable. In addition, the field rheostat 17 affords further possibilities for voltage control. As a result, it is possible to supply single phase welding current to the electrode of a pipe welder at almost any desired voltage and without unbalancing the three phase supply circuit.

Figure 2 illustrates another method by which similar results may be obtained. Figure 2 shows a partial central sectional view of a generator having a plurality of independent circuits which may be separately controlled. The generator, of course, is adapted to be driven by a polyphase motor energized directly from the supply source, as in Figure 1. As shown in Figure 2, a generator 30 comprises a frame 31 having separate armature cores 32 and 33 supported therein. A single phase armature winding, one coil of which is shown at 34, is common to the cores 32 and 33. The rotor of the armature includes a shaft 35 and a spider 36 thereon. Upon the spider 36 are mounted separate sets of field poles 37 and 38 having independent windings. The energization of the windings of the separate sets of field poles may be controlled by field rheostats 39 and 40 connected in series between the field windings and any suitable source of excitation, such as a direct-connected exciter.

The resultant voltage generated by the generator 30, obviously, will depend upon the magnitudes of the voltages induced by the separate sets of field poles 37 and 38 which, in turn, depend upon the excitation supplied to the windings thereof. By means of the rheostats 39 and 40 and potentiometer rheostats (not shown) it will be possible to vary the excitation of the separate sets of field poles up or down, and also to reverse its direction so that practically any desired voltage can be obtained. The output of the generator will be supplied to the transformer of the welder, as shown in Figure 1. It will be apparent that the generator shown in Figure 2 is similar in effect to that shown in Figure 1 except that in Figure 1, a single field rheostat controls the equal voltages developed in both windings, and in Figure 2 separate field windings, independently adjustable, induce different voltages in a single winding and the resultant is supplied to the welding transformers.

Figure 3 illustrates a further modification of the invention, which is the present preferred form of the invention. In Figure 3, a polyphase motor 41 connected to any suitable source, as in the case of the motor 15 of Figure 1, is adapted to drive generators 42 and 43, as well as a direct-connected exciter 44. I prefer to use three phase generators, as shown in 42 and 43, but connect them for single phase operation in order to obtain increased output. The generators 42 and 43 are connected in series to the primary windings of transformers 45 and 46. By means of switches 47, 48, 49, and 50, the primary windings of the transformers 45 and 46 may be connected in series or in parallel, although these switches may not be necessary in order to obtain the desired range of voltage control.

The field windings of generators 42 and 43 are independently controlled by means of field rheostats 51 and 52, the excitation being derived from the exciter 44. Thus, by varying the excitation of the two generators or the relative polarity thereof, it will be possible to obtain a wide range of voltages varying from double the voltage of one generator down to zero.

In order to control the supply of current to the transformer 45, the secondaries of which are connected to an electrode 53, so as to prevent arcing and destructive pitting of the electrode when a trailing end of a pipe length, indicated at 54, leaves the electrode, I employ a switch 55 actuated by a pipe to cause shunting of the field magnet windings of the generators 42 and 43. The switch 55 is opened as soon as the leading end of a pipe length 54 engages it. As long as the switch 55 is open, shunting contactors 56 and 57 are deenergized and protective resistors 58 and 59 in the field magnet winding circuits are shunted by back contacts of the relays 56 and 57. When the trailing end of the pipe leaves the switch, the switch closes and causes the energization of the windings of the shunting relays from the exciter 44 by means of an obvious energizing circuit. When the relays 56 and 57 are energized, their front contacts close, shunting the field magnet windings of the generators 42 and 43. The back contacts of the relays open, inserting in the shunted field circuits the protective resistors 58 and 59 to prevent overloading the exciter 44. Obviously, as soon as the field magnet windings of the generators are shunted, the output of the generator drops to zero and, when the trailing end of the pipe finally passes away from the electrode 53, no voltage exists between the halves of the electrode and, consequently, no current is supplied to the pipe being welded. In order to control the welding current in accordance with the speed of the pipe traversing the welder, I provide an idler roll 60, adapted to be engaged by the pipe as it passes through the welder. A centrifugal switch 61 is controlled by the roll 60, so as to close its contacts when the speed of the pipe is above or below a predetermined range. When the switch 61 closes its contacts, it has the same effect as the closing of the switch 55, that is, to shunt the field circuits of the generators 42 and 43 so that the supply of current to the electrode is interrupted. Obviously, the actuating mechanism for the switch 61 may include means for adjusting the speed at which it closes its contacts.

All of the systems shown and described herein are adapted to operate slightly above the knee of the saturation curve shown in Figure 4 or, in other words, between the points on the curve between the lines $b$ and $b'$ and $h$ and $h'$. Stability of operating characteristics is thus assured and there is no danger that a voltage adjustment once made will have to be changed as long as external conditions remain the same.

It will be apparent from the foregoing that I have invented a system of current supply for electric welding apparatus which is characterized by numerous advantages over any systems known to the prior art. By means of the invention, it is possible to supply single phase current of a variable voltage from a polyphase source without unbalancing the latter. A very wide range of voltages is made available without unduly increasing the cost or complexity of the system. The various pieces of apparatus employed are standard, or practically standard, so that their manufacture does not entail any unusual expense. The double winding generator 16, for example, may be of the usual construction except that both windings are located so that voltages generated therein will be in phase. The combination in which this generator is employed, however, is believed to be entirely novel. The double field generator shown in Figure 2 is similarly constructed along the lines of present generator designs, but the feature of providing separate cores and individual field structures therefor is novel according to my present information. The apparatus of the system shown in Figure 3 is largely of standard manufacture but the combination is entirely novel compared to anything previously known. As will be apparent from an examination of the drawing, the circuits are all very simple and the control highly flexible. In addition, the invention provides a system which operates under stable conditions without requiring attention except when a change in external conditions is encountered. The invention is also equally adapted to rotating or stationary transformers.

Although I have illustrated and described but a few modifications of the invention, it will be obvious that many changes in the forms of the invention shown herein may be made. Such changes as are contemplated by the scope of the invention may, of course, be made without departing from the spirit thereof as set forth in the appended claims.

I claim:

1. In a progressive seam welding apparatus, the combination with a welding electrode, of a generator for supplying welding current thereto, and means including a flag switch adapted to be engaged by the work traversing the welder for controlling the supply of current from the generator to the electrode in accordance with the movement of the work.

2. A current supply system for a progressive, electric pipe welder including a generator having a field winding, and means controlled by the passage of pipe through the welder for shunting the generator field winding to control the supply of current to the welder.

3. A current supply system for a progressive, electric seam welder comprising a generator for supplying current to the welder, and means actuated by the work in its passage through the welder for varying the excitation of the generator field to vary the output of the generator.

4. In a progressive, electric seam welder, the combination with means for supplying welding current, of means responsive to a stoppage of the work in the welder for discontinuing the supply of current from said means.

5. In a progressive, electric welding apparatus, current supply means connected thereto, and means for rendering said current-supply means ineffective, and means responsive to the speed of the work traversing the welder for actuating the last-mentioned means when said speed varies from a predetermined range.

6. The combination with a progressive, electric seam welder including an electrode, of a generator for supplying current thereto, a field for said generator, means for controlling the field, and means controlled by the passage of work through the welder for operating the field control means of the generator in accordance with the movement of the work through the welder.

7. In a welder, an electrode, current-supply means therefor including a generator, and means actuated by the movement of the work through the welder for varying the voltage of said generator.

8. The apparatus defined by claim 7 wherein said work-actuated means is so positioned as to be operated a predetermined time in advance of the departure of the work from contact with the electrode.

9. The apparatus defined by claim 7 wherein said work-actuated means is so positioned as to be operated a predetermined time in advance of the engagement of the work by the electrode.

10. A current-supply system for a progressive electric welder including a generator having a field winding and means controlled by the passage of the work through the welder for terminating the field current traversing said winding, to control the supply of current to the welder.

11. The combination with a welder having a rotary electrode, of an electric current supply system for the electrode including a generator, and means actuated by the work in its movement through the welder for controlling the energization of the generator field to vary the current supplied to the electrode.

12. In a welder, means for supplying welding current to the work, a current source for said means, and means actuated by the movement of the work past the first-mentioned means for varying the voltage of said current source.

13. The apparatus defined by claim 12 wherein said work-actuated means is so positioned as to be operated a predetermined time in advance of the departure of the work from said current supply means.

14. The apparatus defined by claim 12 wherein said work-actuated means is so positioned as to be operated a predetermined time in advance of the arrival of the work adjacent said current supply means.

JAMES V. CAPUTO.